United States Patent [19]

Godfrey

[11] Patent Number: 4,929,509
[45] Date of Patent: May 29, 1990

[54] ADHESIVES BASED ON AMORPHOUS PROPYLENE/HEXENE COPOLYMERS

[75] Inventor: Darryl A. Godfrey, Longview, Tex.

[73] Assignee: Eastman Kodak Company, Rochester, N.Y.

[21] Appl. No.: 215,681

[22] Filed: Jul. 6, 1988

[51] Int. Cl.$^5$ .................. B32B 15/08; B32B 27/32; B32B 21/08; C08L 23/20

[52] U.S. Cl. .................. 428/461; 428/483; 428/484; 428/513; 428/500; 524/274; 524/518; 524/528; 525/240; 525/210

[58] Field of Search ............... 525/240, 210; 428/513, 428/461, 483, 484

[56] References Cited

U.S. PATENT DOCUMENTS

| | | |
|---|---|---|
| 3,278,504 | 10/1966 | Eells et al. . |
| 3,341,621 | 9/1967 | Hagemeyer, Jr. et al. . |
| 3,376,250 | 4/1968 | Newland et al. . |
| 3,409,585 | 11/1968 | Hagemeyer, Jr. et al. . |
| 3,519,586 | 7/1970 | Guillet et al. . |
| 3,923,758 | 12/1975 | Carter, Jr. et al. . |
| 3,954,697 | 5/1976 | McConnell et al. . |
| 4,022,728 | 5/1977 | Trotter et al. . |
| 4,049,752 | 9/1977 | Albers . |
| 4,072,735 | 2/1973 | Ardemagni . |
| 4,072,812 | 2/1978 | McConnell et al. . |
| 4,072,813 | 2/1978 | McConnell et al. . |
| 4,105,718 | 8/1978 | Weemes et al. . |
| 4,112,208 | 9/1978 | McConnell et al. . |
| 4,120,916 | 10/1978 | Meyer, Jr. et al. . |
| 4,146,521 | 3/1979 | Godfrey . |
| 4,146,586 | 3/1979 | McConnell et al. . |
| 4,178,272 | 12/1979 | Meyer, Jr. et al. . |
| 4,210,570 | 7/1980 | Trotter et al. . |
| 4,217,428 | 8/1980 | McConnell et al. . |
| 4,259,470 | 3/1981 | Trotter et al. . |
| 4,264,756 | 4/1981 | Trotter et al. . |
| 4,288,358 | 9/1981 | Trotter et al. . |
| 4,471,086 | 9/1984 | Foster . |
| 4,567,223 | 1/1986 | Ames . |
| 4,719,260 | 11/1988 | Stuart, Jr. et al. . |
| 4,749,739 | 6/1988 | Foster et al. . |

FOREIGN PATENT DOCUMENTS

| | | |
|---|---|---|
| 856337 | 11/1970 | Canada . |
| 0252718 | 1/1988 | European Pat. Off. .. |

*Primary Examiner*—Carman J. Seccuro
*Attorney, Agent, or Firm*—Thomas R. Savitsky; Mark A. Montgomery; William P. Heath

[57] ABSTRACT

The present invention relates to a two component adhesive composition containing a propylene-hexene copolymer having about 6 to less than 15 mole percent hexene and a compatible tackifying resin.

26 Claims, No Drawings

ADHESIVES BASED ON AMORPHOUS PROPYLENE/HEXENE COPOLYMERS

FIELD OF INVENTION

The present invention is in the field of amorphorus propylene-hexane copolymers useful in hot melt adhesives.

BACKGROUND OF THE INVENTION

Adhesives for use in glue gun sticks require durability, high strength bonds, and the ability to bond to a variety of substrates. Such adhesives are useful for many product assembly applications such as the consumer glue stick market for the do-it-yourself handyman and/or crafter.

Most adhesive compositions currently marketed for such applications are ethylene-vinyl acetate (EVA) based blends. These EVA blends are poor at accepting stress without failing adhesively. It would be desirable to have adhesive compositions that are good at accepting stress without failing adhesively.

It is taught in the prior art that certain useful adhesives can be made based on propylene-hexene olefin copolymers (see, e.g., U.S. Pat. Nos. 3,954, 697 and 4,178,272).

U.S. Pat. No. 4,210,570 teaches hot-melt, pressure sensitive adhesive blends containing plasticizing oils, compatible tackifiers and at least one $C_3$ to $C_5$ linear α-olefin and 15 to 60 mole percent of at least one $C_6$ to $C_{10}$ linear α-olefin.

It has now been discovered that blends of a propylene-hexene copolymer having a 1-hexene content of less than 15 mole percent in combination with a tackifying agent, in proportions as described hereinafter, have excellent properties for use as adhesives in glue gun sticks.

SUMMARY OF THE INVENTION

The present invention is directed to a hot-melt adhesive composition suitable for making a glue gun stick comprising a blend of:
(1) about 40 to 80 weight percent of a substantially amorphorus propylene-hexene copolymer having a melt viscosity of about 2,000 to 30,000 cps at 190° C.; and an amount of 1-hexene of from about 6 to less than 15 mole percent; and
(2) about 60 to 20 weight percent of at least one compatible tackifying resin;
wherein said adhesive composition has a bond strength of at least about 150 pounds on oak and a time to bond failure of greater than about 2 minutes using ASTM Procedure D-1002 with a tensile tester crosshead speed of 0.05 inches per minute; and a good to excellent bond flexure rating.

The present invention is also directed to a coated article comprising a substrate coated with the adhesive composition of the invention.

DETAILED DESCRIPTION OF THE INVENTION

The adhesive composition of the present invention is, in its broadest scope, a two component system. Therefore, a plasticizing oil, as required in U.S. Pat. No. 4,220,570 is not required and it is preferred that the adhesive composition of the present invention has substantially no amount of such plasticizing oil. In the glue gun stick applications contemplated for the present invention. It is not necessary that the adhesives are pressure-sensitive. Therefore, the adhesives of this invention are not necessarily tacky.

The propylene-hexene copolymers useful in the adhesives of the present invention can be made using polymerization techniques known in the art and/or described herein. For example, the propylene-hexene copolymer of this invention can be prepared by the copolymerization of propylene and hexene by anionic coordination catalysts such as disclosed in U.S. Pat. No. 4,425,257, which is incorporated herein by reference in its entirety. A preferred catalyst is Lynx 900 ( a commercially available catalyst from Catalyst Resources Inc., Houston, Texas). Other suitable catalyst include aluminum-activated titanium trichloride ("AA-TiCl$_3$"). An aluminum alkyl such as triethyl-aluminum ("Et$_3$Al") or the like is used as a cocatalyst. The temperature of the reaction is typically between about 150° C. and about 180° C. and the pressure is typically between about 600 and about 1,200 pounds per square inch gauge (psig). General polymerization conditions and catalysts are disclosed in U.S. Pat. Nos. 3,954,697; 4,178,272; and 4,120,570, which are incorporated herein by reference in their entirety.

It is preferred that the process is run continuously with agitation, e.g., stirring. Optionally, a solvent can be used for the reaction such as mineral spirits, hexane, benzene, and the like. The reaction also must proceed in the presence of a chain transfer agent such as hydrogen to obtain the proper viscosity.

The copolymers useful in the adhesives of the present invention have about 6 to less than 15 mole percent 1-hexene content. Below about 6 mole percent the copolymer produces adhesives with insufficient flexibility. At 15 mole percent or higher the bond strength declines and the adhesives may be too flexible for making into desirable glue gun sticks. A preferred amount of 1-hexene is about 7 to about 14 mole percent.

Hexene content of the copolymer can be determined by either $C^{13}$ nuclear magnetic resonance or Fourier Transfer infrared spectroscopy (FTIR). In the FTIR method the peak ratio of the 727 and 972 wavenumber peaks are determined. The percent hexene is determined from a calibration curve.

The copolymers useful in the present invention can be modified (e.g., maleated according to the procedures of U.S. Pat. No. 4,567,223, incorporated herein by reference in its entirety) to have an acid number of at least 5. However, such modification is not known to have any particular advantage in the adhesives of this invention, and, accordingly, unmodified copolymers (e.g., acid number less than 0.5) are preferred.

The propylene-hexene copolymer comprises about 40 to 80 weight percent of the adhesive composition (i.e., based on the total weight of copolymer plus tackifying resin); preferred is about 50 to 80 weight percent; and most preferred is about 70 weight percent. The melt viscosity of the copolymer is about 2,000 to 30,000 centipoise (cps) at 190° C., preferred is about 3,000 to 20,000 cps and most preferred is about 5,000 cps.

Melt viscosities as described herein can be determined on a Brookfield Model RVT Thermosel viscometer using a Number 27 spindle in accordance with ASTM Procedure D-1824-66

To achieve the desired percent hexene content in the copolymer of this invention, it is also possible to blend two or more amorphous propylene-hexene copolymers (APH's) with varying percentages of hexene in order to arrive at a copolymer blend having an overall desired percent hexene content.

The tackifying resins useful in the adhesive compositions of this invention have Ring and Ball softening points of about 95° C. to about 135° C. and can be a hydrocarbon resin as DAC-B hydrocarbon resin prepared according to the process disclosed in U.S. Pat. No. 3,701,760 as well as other hydrocarbon resins, synthetic polyterpenes, rosin esters and the like. One such particularly suitable hydrocarbon tackifying resin is a hydrocarbon resin having a softening point of 130° C. and available commercially as Eastotac Resin H-130W from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These commercially available hydrocarbon tackifying resins typically exhibit a Ring and Ball softening point of from about 125° C.; an acid number of from about 0 to 2; an acid value of less than about 1; and an iodine value of about 75–100.

Also suitable resins are the terpene polymers having a suitable Ring and Ball softening point such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpiene, terpinolene, limonene, turpentine, a terpene cut or fraction, and various other terpenes. Particularly useful starting materials are terpene mixtures containing at least 20 percent 62-pinene and/or limonene or dipentene (racemic limonene), and the "sulfate turpentine" obtained as a by-product in the sulfate pulping process.

The hydrocarbon resins and polyterpene tackifying resins can be used either alone or in combination. These tackifying resins can be used in amounts of about 60 percent to 20 percent by weight of the adhesive composition (i.e., based on the total weight of copolymer plus tackifying resin), preferably about 50 to 20 percent by weight, and most preferably about 30 percent by weight.

The adhesive compositions of this invention are prepared by blending together the adhesive componets in the melt at a temperature of about 160° C. to about 200° C. until a homogeneous mixture is obtained. Various methods of blending materials of this type are known to the art and any method that produces a homogeneous mixture is satisfactory. These components blend easily in the melt and a heated vessel equipped with a stirrer is all that is required. For example, a Cowles stirrer provides effective mixing for preparing these compositions. Solvents such as hexane, heptane, minteral spirits, xylene, toluene, benzene, chlorinated hydrocarbons, etc. are not needed to prepare the compositions of this invention; however, they can be used if desired.

In addition to the adhesive components, it is desirable for the adhesive compositions to contain up to 1.5 percent, preferably about 0.1 percent to about 1.5 percent by weight, and most perferably about 0.25 percent to 1.0 percent by weight, of one or more antioxidants. Antioxidants that are effective include, for example, tris(di-t-butyl-p-hydroxybenzyl)-trimethyl-benzene (Ionox 330), alkylated bisphenol (Naugawhite), zinc dibutyl dithiocarbamate (Butyl Zimate), and 4,4'-methylene bis(2,6-di-tert-butylphenol) (Ethyl 702), tetrakis[methylene(3,5-di-tert-butyl-4-hydroxyhydrocinnamate)methane] (Irganox 1010), lauryl stearyl thiodipropionate (Plastanox 1212), and dilauryl 3,3'-thiodipropionate (Plastanox LTDP) and 2,6-di-tert-butyl-p-cresol (BHT) and the like.

Additives such as nucleating agents, pigments, colorants, fillers, solvents, and the like can also be added to the adhesive compositions of the present invention. Additional additives such as elastomers can also be added to the adhesive compositions; however, the presence of such elastomers may be adverse to the composition's desired properties, (e.g., temperature resistance). Therefore, it is preferable that the compositions of the present invention contain substantially no elastomer.

The adhesive compositions of the present invention are typically in the form of slats prior to being converted into glue sticks. In such slats it is common to use a slat coating of about 1 to 4 weight percent of a crystalline, polyethylene based wax such as Epolene C-15 wax, available from Eastman Chemical Products, Inc.

The substrate onto which the adhesive of the present invention are applied can be any substrate commonly encountered in the art such as metal, e.g., steel or aluminum; wood, e.g., pine or oak; and polyesters, e.g., poly(ethylene terephthalate). Adhesives containing a copolymer having a higher percent hexene level (e.g., about 14 mole percent) are preferably applied to metal, and adhesives containing a copolymer having a lower percent hexene level (e.g. about 6 to 7 mole percent) are preferably applied to wood.

When the adhesive composition blends of the present invention are allowed to cool slowly from the molten state, they exhibit surface tack for about one hour. After this time, some morphology change results in loss of substantial tack. It is anticipated that rapid cooling in chilled water will hasten this change.

Thus, it is preferred that the adhesive compositions of the present invention are substantially non-tacky after cooling to about room temperature or below. The adhesive compositions of the present invention have a bond strength of at least 150 pounds on oak, preferably at least 250 pounds and most preferably at least 350 pounds.

The primary test used to determine bond strength of these adhesives is ASTM Procedure D-1002, "Strength Properties of Adhesives in Shear by Tension Loading". All substrates used are 1 inch wide by 4 inches long. A lap shear area of 1 inch by 1 inch is tested after 24 hours conditioning at 73° C. and 50 percent relative humidity. The surfaces are sanded with 400 grit sandpaper and wiped clean before bonding. An insertion tensile tester operating at a crosshead speed of 0.05 inches per minute is used for bond strength testing.

When testing the adhesive compositions of this invention in accordance with ASTM Procedure D-1002, it is noted that the time to adhesive failure is higher than the time for EVA-based adhesives. The time to adhesive failure in such tests for the adhesive compositions of the present inventions is greater than about 2 minutes, preferably greater than about 10 minutes.

The compositions containing copolymers having lower percent hexane levels (e.g., about 7 mole percent) have higher bond strengths very similar to a comparable EVA control; however, the time to failure is longer and the mode of failure is cohesive (not adhesive as is the case of an EVA control adhesive). The adhesive compositions containing copolymers having higher percent hexane levels (e.g., about 14 mole percent) have relatively lower bond strengths, but the time of failure of such bonds is even longer, e.g., 10-15 minutes or longer. The mode of failure of the higher percent hexene-based compositions is also cohesive.

The property of longer time to bond failure of the adhesives of the present invention is important for certain end use applications. Such a longer time to bond failure is indicative of improved resilency or flexibility. To help better determine the level of flexibility of the compositions of the present invention, a bond flexure test was developed. The bond flexure test is performed as follows:

Shear bonds are prepared on steel panels (1/16" thick) and conditioned as described above for ASTM Procedure D-1002. The bond is flexed by placing the testing individual's thumbs on the bonded area and bending of the ends of the steel substrates toward the body of the individual doing the testing. If the bond fails adhesively with little or no bending the adhesive has a poor bond flexure rating. If the bond fails cohesively after the steel has bent a significant amount the adhesive has a good bond flexure rating. If the bond does not fail, even though the steel substrate bends in a horseshoe shape, the adhesive has an excellent bond flexure rating. The adhesives of the present invention have at least a good bond flexure rating and preferably an excellent bond flexure rating.

The low temperature resistance of the adhesive composition of the invention is typically greater than 100 pounds, more preferably greater than 200 pounds. The low temperature resistance can be determined by determining the tensile shear strength on steel at $-27°$ C.

The following examples are to illustrate the invention but should not be interpreted as a limitation thereon.

EXAMPLES

EXAMPLE 1

A 6.7-gallon stirred loop reactor was fed continuously with propylene, 1-hexene, and catalyst slurry in mineral spirits (solvent). The copolymer, monomers, and solvent mixture containing catalyst was removed from the reactor continuously to a letdown tank. Unreacted monomers and some solvent were flashed overhead. The copolymer and remaining solvent mixture was treated with steam, air, and nitrogen to deactivate the catalyst and remove solvent. The copolymer was then alumina bed treated. Reactor conditions and monomer conversions were as shown below:

| | |
|---|---|
| Propylene Charge, Pound/Hour | 6.10 |
| Hexene Charge, Pound/Hour | 1.26 |
| Catalyst Type | Lynx 900 |
| Catalyst Charge, Pound/Hour | 0.002 |
| Cocatalyst | triethyl-aluminum |
| Cocatalyst/Catalyst Mole Ratio | 5/1 |
| Copolymer Produced, Pound/Hour | 6.42 |
| Propylene Conversion, % | 87.0 |
| 1-Hexene Conversion, % | 87.6 |
| Reactor Temperature, °C. | 170 |
| Reactor Jacket Temperature, °C. | 106 |
| Reactor Pressure, psig | 1040 |
| Stirrer Speed, Revolutions Per Minute (rpm) | 750 |
| Off Gas, Pounds Per Hour | 0.849 |

The propylene-hexene copolymer had a viscosity at 190° C. of 4,500 cps. It contained 6.9 mole percent 1-hexene as determined by both infrared spectral analysis and material balance data. Hydrogen was added as needed to control viscosity.

EXAMPLE 2

The system of Example 1 was used with the following feeds:

| | |
|---|---|
| Propylene Charge, Pound/Hour | 6.30 |
| Hexene Charge, Pound/Hour | 2.78 |
| Catalyst Type | Lynx 900 |
| Catalyst Charge, Pound/Hour | 0.002 |
| Cocatalyst | triethyl-aluminum |
| Cocatalyst/Catalyst Mole Ratio | 5/1 |
| Copolymer Produced, Pound/Hour | 7.8 |
| Propylene Conversion, % | 86.8 |
| 1-Hexene Conversion, % | 83.6 |
| Reactor Temperature, °C. | 167 |
| Reactor Jacket Temperature, °C. | 107 |
| Reactor Pressure, psig | 1040 |
| Stirrer Speed, Revolutions Per Minute (rpm) | 750 |
| Of Gas, Pounds Per Hour | 0.89 |

The propylene-hexene copolymer had a viscosity at 190° C. of 4,700 cps. It contained 14.2 mole percent 1-hexene as determined by infrared spectral analysis and material balance data. Hydrogen was added as needed to control viscosity.

EXAMPLES 3 and 4

The copolymers of Examples 1 and 2 were formulated into adhesive compositions of the present invention (i.e., Examples 3 and 4). The description of these compositions and their properties are given in Table 1. APH is an abbreviation for amorphous propylene-hexene. Irganox 1010 is an antioxidant available from Ciba-Geiby Corporation and Cyanox 1212 is an antioxidant available from American Cyanamid Company. All numbers in the tables across (horizontal) from an individual component refer to the weight percent of that component in the indicated example. The percent hexene in the copolymers is mole percent.

TABLE 1

| | Example No. | |
|---|---|---|
| Components | 3 | 4 |
| Eastotac H-130W | 31.2 | 31.2 |
| APH - 6.9% Hexene, 4,500 cps at 190° C. | 68.35 | — |
| APH - 14.2% Hexene, 4,500 cps at 190° C. | — | 68.35 |
| Irganox 1010 | 0.10 | 0.10 |
| Cyananox 1212 | 0.35 | 0.35 |
| Tensile Shear Strength, pounds | | |
| Oak | 335 | 210 |
| Steel | 215 | 150 |
| Bond Flexure Rating | Good | Excellent |

EXAMPLE 5-25

Amorphous propylene-hexene copolymers with varying amounts of 1-hexene were made in accordance with the teachings contain herein. These copolymers were blended with various other components in accordance with the present invention to obtain adhesive compositions, i.e., Examples 5-25. Various properties of these Examples were also determined. The descriptions of the adhesive compositions and their properties are shown in Tables 2-4. Uness otherwise specified, the hexene in the copolymer is expressed in terms of mole percent and the precentages of components are by weight. Foral 105 is a rosin ester tackifying resin available from Hercules Inc.; Polysar 306G8 is an ethylene-propylene based elastomer available from Polysar, Inc., Canada; and Permalyn 105W is a rosin ester tackifying resin available from Hercules, Inc. Those APH's with an acid number indicated were modified by maleation. The two different APH's in Examples 7 and 25 were blended to achieve an overall mole percent hexene content of about 14.2.

TABLE 2

| Component | Example No. | | | | | | |
|---|---|---|---|---|---|---|---|
| | 5 | 6 | 7 | 8 | 9 | 10 | 11 |
| Eastotac H-130 | 30.00 | 30.00 | 30.00 | 45.00 | — | 30.00 | 30.00 |
| Foral 105 | — | — | — | — | — | — | — |
| Polysar 306G8 | 13.00 | 13.00 | 13.00 | 13.00 | 13.00 | 13.00 | 13.00 |
| Permalyn 105N | 15.00 | 15.00 | 15.00 | — | 45.00 | 15.00 | 15.00 |
| Irganox 1010 | 0.10 | 0.10 | 0.10 | 0.10 | 0.10 | 0.10 | 0.10 |
| Cyanox 1212 | 0.35 | 0.35 | 0.35 | 0.35 | 0.35 | 0.35 | 0.35 |
| APH - 6.3% Hexene, 10 Acid No. | 41.55 | — | — | — | — | 41.55 | — |
| APH - 14.2% Hexene, 8 Acid No. | — | 41.55 | — | 41.55 | 41.55 | — | — |
| APH - 14,000 cps at 190° C., 15.6% Hexene | — | — | 13.00 | — | — | — | — |
| APH - 4,000 cps at 190° C., 11.7% Hexene | — | — | 28.55 | — | — | — | — |
| APH - 6.9% Hexane | — | — | — | — | — | — | 41.55 |
| Tensile Shear Strength, lb. | | | | | | | |
| Oak | 465 | 230 | 265 | 370 | 150 | 365 | 335 |
| Pine | 405 | 250 | 250 | 335 | 135 | 315 | 315 |
| Steel | 255 | 135 | 130 | 135 | 120 | 200 | 205 |
| Aluminum | 260 | 125 | 140 | 115 | 110 | 200 | 225 |
| Viscosity @177° C., cps | 6,875 | — | — | — | — | — | — |

TABLE 3

| Component: | Example No. | | | | | | | | |
|---|---|---|---|---|---|---|---|---|---|
| | 12 | 13 | 14 | 15 | 16 | 17 | 18 | 19 | 20 |
| Eastotac H-130W | 50.00 | 20.00 | 50.00 | 20.00 | 50.00 | 20.00 | 35.00 | 35.00 | 35.00 |
| APH - 6.9% Hexene | 35.55 | 79.55 | 49.55 | 65.55 | 42.55 | 72.55 | 50.55 | 64.55 | 57.55 |
| Polysar 306G8 | 14.00 | — | — | 14.00 | 7.00 | 7.00 | 14.00 | — | 7.00 |
| Irganox 1010 | 0.10 | 0.10 | 0.10 | 0.10 | 0.10 | 0.10 | 0.10 | 0.10 | 0.10 |
| Cyanox 1212 | 0.35 | 0.35 | 0.35 | 0.35 | 0.35 | 0.35 | 0.35 | 0.35 | 0.35 |
| Viscosity @177° C. | 15,000 | 4,690 | 2,550 | 9,750 | 6,125 | 6,625 | 11,625 | 3,440 | 6,625 |
| Tensile Shear Strength, lb. | | | | | | | | | |
| Oak | 340 | 280 | 565 | 255 | 535 | 250 | 290 | 475 | 430 |
| Pine | 335 | 270 | 510 | 245 | 505 | 230 | 300 | 410 | 385 |
| Steel | 230 | 150 | 420 | 105 | 310 | 15 | 125 | 240 | 215 |
| Aluminum | 215 | 125 | 370 | 95 | 325 | 65 | 170 | 245 | 185 |
| Temperature Resistance | | | | | | | | | |
| Tensile Shear Strength on Steel @-27° C., lb. | 40 | 168 | 110 | 133 | 58 | 155 | 83 | 130 | 100 |

TABLE 4

| Component | Example No. | | | | |
|---|---|---|---|---|---|
| | 21 | 22 | 23 | 24 | 25 |
| APH - 6.9% Hexene | 68.35 | — | 65.35 | 62.35 | — |
| APH - 6.3% Hexene, 10 Acid No. | — | 68.35 | — | — | — |
| APH - 14,000 cps, 15.6% Hexene | — | — | — | — | 21.40 |
| APH - 4,000 cps, 11.7% Hexene | — | — | — | — | 47.15 |
| Polysar 306G8 | — | — | 3.00 | 6.00 | — |
| Eastotac H-130W | 31.20 | 31.20 | 31.20 | 31.20 | 31.00 |
| Irganox 1010 | 0.10 | 0.10 | 0.10 | 0.10 | 0.10 |
| Cyanox 1212 | 0.35 | 0.35 | 0.35 | 0.35 | 0.35 |
| Viscosity @177° C., cps | 3,815 | 3,375 | — | — | 5,625 |

TABLE 4-continued

| Component | Example No. | | | | |
|---|---|---|---|---|---|
| | 21 | 22 | 23 | 24 | 25 |
| Tensile Shear Strength lb. | | | | | |
| Oak | 335 | 385 | 325 | 295 | 210 |
| Pine | 335 | 375 | 315 | 270 | 230 |
| Steel | 215 | 200 | 185 | 170 | 150 |
| Aluminum | 235 | 200 | 205 | 145 | 150 |
| Temperature Resistance Tensile Shear Strength on Steel @-27° C., lb. | 150 | 110 | 125 | 70 | 205 |
| Bond Flexure Rating | Good | Good | Good | Good | Excellent |

I claim:

1. A hot-melt adhesive composition suitable for making a glue gun stick comprising a blend of:
   (1) about 40 to 80 weight percent of an unmodified substantially amorphous propylene-hexene copolymer having a melt viscosity of about 2,000 to 30,000 cps at 190° C.; and an amount of 1-hexene of from about 6 to less than 15 mole percent; and
   (2) about 60 to 20 weight percent of at least one compatible tackifying resin;

wherein said adhesive composition has substantially no amount of plasticizing oil, is non-tacky at room temperature, has a bond strength of at least about 150 pounds on oak and a time to bond failure greater than about 2 minutes using ASTM Procedure D-1002 with a tensile tester crosshead speed of 0.05 inches per minute; and a good to excellent bond flexure rating.

2. The composition of claim 1 having a melt viscosity of about 3,000 to 20,000 cps at 190° c.

3. The composition of claim 1 containing up to 1.5 weight percent of at least one antioxidant.

4. The composition of claim 1 in the form of a slat coated with about 1 to 4 weight percent of a substantially crystalline polyethylene-based wax.

5. The composition of claim 1 having a bond strength of at least about 250 pounds on oak, a time to failure of at least about 10 minutes, and an excellent bond flexure rating.

6. The composition of claim 1 having a bond strength of at least about 350 pounds on oak.

7. The composition of claim 1 wherein Component (1) is present in an amount of about 50 to about 80 weight percent and Component (2) is present in an amount of about 50 to about 20 weight percent.

8. The composition of claim 1 wherein said tackifying resin is polyterpene or a hydrocarbon resin.

9. The composition of claim 1 wherein said tackifying resin is Eastotac H-130W.

10. A hot melt adhesive composition suitable for making a glue gun stick comprising a blend of:
   (1) about 50 to 80 weight percent of an unmodified substantially amorphous propylene-hexene copolymer having a melt viscosity of about 5,000 cps at 190° C.; and an amount of 1-hexene of about 7 mole percent; and
   (2) about 50 to 20 weight percent of at least one compatible tackifying resin;
wherein said adhesive composition has substantially no amount of plasticizing oil, is non-tacky at room temperature, has a bond strength of at least about 250 pounds on oak and a time to failure of greater than about 2 minutes using ASTM Procedure D-1002 with a tensile tester crosshead speed of 0.05 inches per minute; and a good flexure rating.

11. The composition of claim 10 containing up to about 1.5 weight percent of at least one antioxidant.

12. The composition of claim 11 wherein said tackifying resin is Eastotac H-130W; the amount of Component (1) is about 70 weight percent; and the amount of Component (2) is about 30 weight percent.

13. A hot-melt adhesive composition suitable for making a glue gun stick comprising a blend of:
   (1) about 50 to 80 weight percent of an unmodified substantially amorphous propylene-hexene copolymer having a melt viscosity of about 5,000 cps at 190° C.; and an amount of 1-hexene of about 14 mole percent; and
   (2) about 50 to about 20 weight percent of at least one compatible tackifying resin;
wherein said adhesive composition has a bond strength of at least about 150 pounds on oak and a time to failure of greater than about 10 minutes using ASTM Procedure D-1002 with a tensile tester crosshead speed of 0.05 inches per minute; and an excellent flexure rating.

14. The composition of claim 13 containing up to about 1.5 weight percent of at least one antioxidant.

15. The composition of claim 14 wherein said tackifying resin is Eastotac H-130W; the amount of Component (1) is about 70 weight percent; and the amount of Component (2) is about 30 weight percent.

16. A coated article comprising a substrate coated with an effective amount of the composition of claim 1.

17. The coated article of claim 16 wherein said substrate is metal, wood, or a polyester.

18. A coated article comprising a substrate coated with an effective amount of the composition of claim 10.

19. The coated article of claim 18 wherein said substrate is metal, wood, or a polyester.

20. A coated article comprising a substrate coated with an effectual amount of the composition of claim 13.

21. The coated article of claim 20 wherein said substrate is metal, wood, or a polyester.

22. The coated article of claim 16 wherein said substrate is metal or wood.

23. The coated article of claim 22 wherein said substrate is metal.

24. The adhesive composition of claim 1 wherein said adhesive composition comprises a two component system.

25. The adhesive composition of claim 1 wherein said composition consists essentially of the blend of Components (1) and (2).

26. A non-tacky hot-melt adhesive composition suitable for making a glue gun stick comprising a blend of:
   (1) about 40 to 80 weight percent of an unmodified substantially amorphous proplyene-hexane copolymer having a melt viscosity of about 2,000 to 30,000 cps at 190° C.; and an amount of 1-hexane from about 6 to less than 15 mole percent; and
   (2) about 60 to 20 weight percent of at least one compatible tackifying resin;
wherein said adhesive composition has substantially no amount of plasiticizing oil, has a bond strength of at least about 150 pounds on oak and a time to bond failure of greater than about 2 minutes using ASTM Procedure D-1002 with a tensile tester crosshead speed of 0.05 inches per minute; and a good to excellent bond flexure rating.

* * * * *